United States Patent [19]

Bose

[11] Patent Number: 4,960,290
[45] Date of Patent: Oct. 2, 1990

[54] WHEEL ASSEMBLY SUSPENDING

[75] Inventor: Amar G. Bose, Wayland, Mass.

[73] Assignee: Bose Corporation, Framington, Mass.

[21] Appl. No.: 350,935

[22] Filed: May 10, 1989

[51] Int. Cl.[5] .......................... B60G 13/18; F16F 7/10
[52] U.S. Cl. ........................................ 280/692; 267/221;
  188/379; 280/697; 280/701
[58] Field of Search ................ 280/707, 714, 708, 697,
  280/701, 692; 267/221, 226; 180/384, 385;
  301/136

[56] References Cited

U.S. PATENT DOCUMENTS

| | | | |
|---|---|---|---|
| 1,805,466 | 5/1931 | DeRam | 267/226 X |
| 2,155,521 | 4/1939 | Zavarella | 267/291 X |
| 2,275,783 | 3/1942 | Martellotti | 188/379 X |
| 2,520,180 | 8/1950 | Thelander | 267/221 X |
| 2,537,479 | 1/1951 | Motte | 180/384 |
| 2,901,239 | 8/1953 | Sethna | 267/224 |
| 2,955,841 | 10/1960 | Faiver et al. | 280/692 |
| 3,422,918 | 1/1969 | Musser, Jr. et al. | 267/221 |
| 3,810,651 | 5/1974 | Puchas | 267/221 |
| 4,155,601 | 5/1979 | Ito | 301/6 WB |
| 4,223,903 | 9/1980 | Grabb et al. | 280/697 |
| 4,368,807 | 1/1983 | McLean | 188/379 |
| 4,733,875 | 3/1988 | Azuma et al. | 280/707 |
| 4,753,328 | 6/1988 | Williams et al. | 280/707 |
| 4,758,018 | 7/1988 | Takizawa et al. | 280/701 |
| 4,819,772 | 4/1989 | Rubel | 280/707 |

FOREIGN PATENT DOCUMENTS 1409520 7/1965 France .

*Primary Examiner*—Richard A. Bertsch
*Attorney, Agent, or Firm*—Fish & Richardson

[57] ABSTRACT

A vehicle suspension system includes a wheel damper in combination with a nonlinear active dynamically controlled system for vehicle suspension.

35 Claims, 2 Drawing Sheets

WHEEL ASSEMBLY SUSPENDING

The present invention relates in general to wheel assembly suspending and more particularly concerns novel apparatus and techniques for absorbing energy from a vehicle wheel assembly moving over a rough surface so as to facilitate significantly reducing forces transmitted to the sprung vehicle body supported on the unsprung wheel assembly.

It is known to use electrically controlled active suspension members, such as a shock absorber containing gas or fluid whose pressure may be electrically controlled to achieve a predetermined characteristic, such as a hard or soft ride, while avoiding bottoming. For example, reference is made to the article in POPULAR SCIENCE for August 1985 pp. 66–69 entitled "Smart suspensions-handling tailored to road and driver." Reference is also made to the article entitled "Optimum Vehicle Suspension With a Damped Absorber" by Ghoneium and Metwalli in Transactions of the ASME for June 1984 p. 148 and the article entitled "On the Application of Optimum Damped Absorber to Vehicle Suspension" by Ghoneium and Cheema in Transactions of the ASME for March 1986 p. 22. Reference is also made to European Application No. 251603 and Australian Application No. 87174560 believed to have been published on or about Jan. 7, 1988, claiming priority of United Kingdom Application No. 86/15427 filed June 24, 1986. These systems have not been widely implemented on commercial vehicles.

A paper entitled "Active Suspensions with Vibration Absorbers and Optimal Output Feedback Control" by A. G. Thompson, B. R. Davis and F. J. M. Salzborn copyright 1984 by the Society of Automotive Engineers, Inc. discloses that in active suspensions for road vehicles with full state feedback the performance index may be improved by the use of dynamic vibration absorbers applied to the axles. The paper describes a suspension assumed to be of the electrohydraulic type, and states that the addition of the vibration absorber should result in a significant hydraulic power saving. FIG. 2 of that paper discloses a shock absorber across the active member comprising an actuator. The paper also teaches a ratio of damping mass to unsprung mass should preferably be between 0.2 and 0.5 in the conclusion and states that the improvement of the axle response which can be achieved by increasing the mass ratio is quite small.

It is an important object of this invention to provide an improved vehicle wheel assembly.

The literature on vehicle suspension systems sometimes uses different terms to describe similar systems, and sometimes uses the same term to describe different systems. In order to clearly understand this invention and to properly distinguish it from approaches in the prior art, there follows certain definitions.

DEFINITION OF A LINEAR SYSTEM

Consider an operation T which, when applied to a time function x(t) yields a unique time function T[x(t)]. Then T applied to the time function $x_1$ yields $T(x_1)$, and T applied to $x_2$ yields $T(x_2)$. The operation T is linear if and only if $$T(ax_1 + bx_2) = aT(x_1) + bT(x_2)$$

for all complex time functions $x_1$ and $x_2$ and for all complex constants a and b. A linear system is one whose excitation x and response y are related by a linear operation $T(x) = y$ over the usable range of the variable x and y in the system. See, Bose and Stevens, "Introductory Network Theory" Harper and Row (1965).

DEFINITION OF A NONLINEAR SYSTEM

A nonlinear system is any system whose excitation and response are not related by a linear operation.

DEFINITION OF A PASSIVE ELEMENT

A passive element is an element for which the energy that can be extracted from its port is less than or equal to the energy that was previously supplied to its port from an external source.

DEFINITION OF A PASSIVE SYSTEM

A passive system is a system composed of all passive elements.

DEFINITION OF A CONTROLLED ELEMENT

A controlled element is an element in which either variable associated with the output port or the relation between these variables can be affected by input signals at the control port or ports.

DEFINITION OF A PASSIVE CONTROLLED ELEMENT

A passive controlled element is a controlled element for which the energy that can be extracted from its output port is less than or equal to the energy that was previously supplied to that port from an external source.

DEFINITION OF AN ACTIVE CONTROLLED SYSTEM

An active controlled system is a system that can accept power at some frequency or frequencies at one or more power supply ports and can deliver power at different frequency or frequencies at an output port under the control of signals at one or more input ports called control ports.

The linearity or nonlinearity of an active controlled system is determined by applying the definition of a linear system to the signals at the input and output ports.

DEFINITION OF A QUASI-STATIC CONTROLLED SYSTEM

A quasi-static controlled system is a controlled system in which the bandwidth of the controlling signals is much less than that of the signals at the output port.

DEFINITION OF A DYNAMIC CONTROLLED SYSTEM

A dynamic controlled system is a controlled system in which the bandwidth of the controlling signals is comparable to that of the signals at the output port.

Prior art suspension systems employing wheel dampers that are described in the literature fall into the following two categories:

1. Passive linear system exemplified by the system described in the aforesaid article of H. Ghoneiun, S. M. Metualli.

2. Active linear systems exemplified by the systems described in the aforesaid article of A. G. Thompson, B. R. Davis and F. J. M. Salzborn.

In both these categories of suspension systems the optimization criterion resulted in significant resistive force (force proportional to the difference in velocities of the spring and nonspring masses) between the unsprung and sprung masses. This resistive force transmits undesirable force to the sprung mass while providing the benefits of damping to the fundamental resonance of the sprung mass with the suspension spring and partial damping to the tire-wheel resonance of the unsprung mass with the tire compliance. The wheel damper in prior art systems was thus called upon only to supply that portion of the damping to the tire-wheel resonance that was not supplied by the resistive force between the unsprung and sprung masses. The result was that the wheel damper did not produce a significant enough performance improvement to justify its cost, and the concept has not found commercial application in automobiles.

The present invention deals with the use of a damper in the specific class of nonlinear, active, dynamically controlled systems for vehicle suspension. Only with this class of systems is it possible to have essentially no net resistive force between the unsprung and sprung masses and to simultaneously maintain control of the vehicle for large vertical road excursions. The absence of the net resistive force provides a desired significant reduction of the acceleration of the sprung mass. However, this benefit can only be realized if a wheel damper is employed in order to remove energy from the resonance of the unsprung mass with the tire. Unlike in the prior art systems which were linear, the wheel damper when used in the present system must supply essentially all the damping to the resonance of the tire with the unsprung mass. This requires that the ratio of the mass of the damper to the unsprung mass be larger than in the prior art linear systems in which the wheel damper provided only partial damping. For passive linear systems it has been shown in the aforesaid Ghoneiun et al article that an optimum performance results from a value of this mass ratio of 0.1. And for active linear systems it has been shown in the aforesaid Thompson et al. article that the optimum value of this mass ratio is between 0.2 and 0.5. It has been discovered that in the case of active nonlinear dynamically controlled systems the optimum value of this mass ratio, considering performance and cost, is substantially 1.0 and the range of practical values of this mass ratio is between 0.5 and 1.5.

According to the invention, in a vehicle having a sprung mass and an unsprung mass including a wheel and a wheel support member, suspension apparatus comprises a nonlinear active dynamically controlled suspension system intercoupling the sprung mass and unsprung mass with a wheel damper connected to the wheel support member. Wheel damper supporting structure connects the wheel damper to the wheel support member constructed and arranged to prevent transfer of force between the unsprung mass and the sprung mass through the wheel damper. The suspension apparatus may comprise a nonlinear active controlled suspension system intercoupling the sprung mass and unsprung mass. There may be a frame connected to the wheel support member by an active suspension member with a wheel rotatably mounted on the wheel support member, and damping structure connected to the wheel support member comprising a damping mass connected to the wheel support member by a spring in parallel with dissipative structure, such as viscous damping fluid or a conventional shock absorber Preferably the ratio of damping mass to unsprung mass is within the range of 0.5 to 1.5 and preferably substantially unity with the unsprung mass of the wheel assembly, typically comprising tire, wheel and axle. Preferably the system is free of a damping element in parallel with an active component of the system. Numerous other features, objects and advantages of the invention will become apparent from the following specification when read in connection with the accompanying drawings in which:

Figure 1:
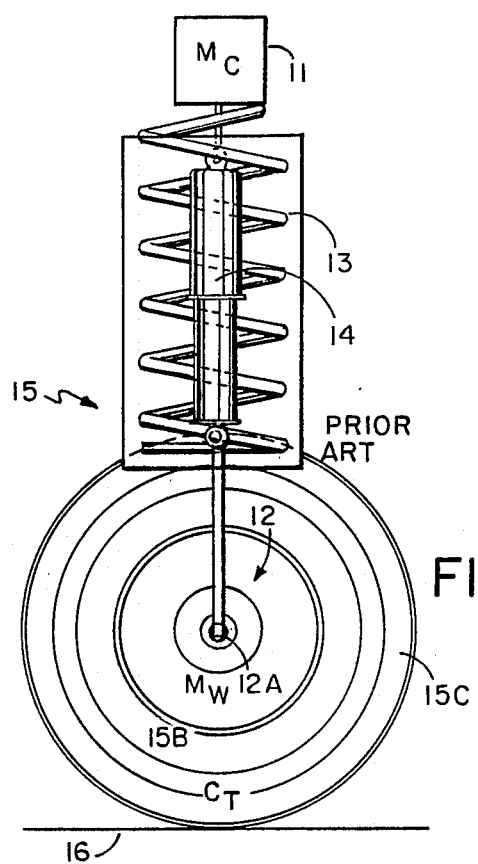
FIG. 1 is a combined block-diagrammatic representation of a typical automobile wheel suspension.

With reference now to the drawing and more particularly FIG. 1 thereof, there is shown a combined block-diagrammatic representation of a typical prior art wheel suspension. The sprung mass of the vehicle 11, typically comprising about one-fourth the mass of the vehicle including the frame and components supported thereon, is connected to the wheel assembly 12 by spring 13 in parallel with shock absorber 14. Wheel support assembly 12 carries on axle 12A wheel 15 including hub 15B and tire 15C. The wheel, brake assembly, if it moves vertically with the wheel, and wheel support assembly are characterized by an unsprung mass $M_W$. Tire 15C has a compliance $C_T$. Tire 15C is shown supported on road 16. Spring 13 is characterized by a compliance $C_S$, and shock absorber 14 is characterized by a mechanical resistance $R_{SH}$.

Figure 2:
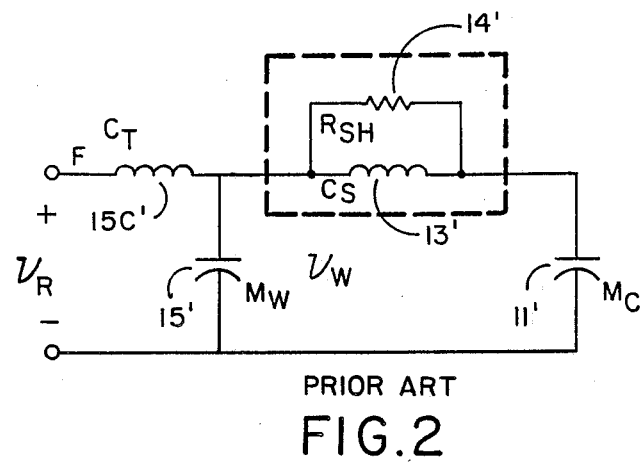
FIG. 2 is a schematic circuit diagram of the mechanical system of FIG. 1.

Referring to FIG. 2, there is shown a schematic circuit diagram of the mechanical system of FIG. 1. $v_R$ represents the vertical velocity of the portion of tire 15C in contact with road 16 and is applied to the tire compliance 15C' in series with spring compliance 13' in series with the vehicle sprung mass portion 11'. The spring compliance 13' is shunted by the shock resistance 14'. The series combination of compliance 13' in shunt with the shock resistance 14' and the sprung mass 11' is shunted by the wheel unsprung mass 15'.

Figure 3:
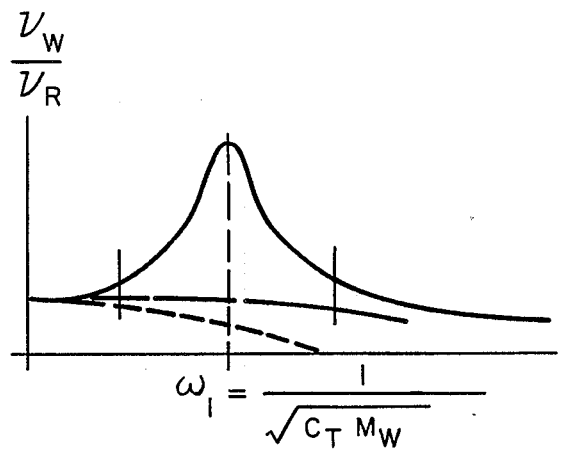
FIG. 3 is a graphical representation of the response of the prior art mechanical circuit of FIG. 2.

This mechanical circuit is characterized by a resonance where the tire compliance $C_T$ resonates with the unsprung mass $M_W$ and corresponds to a high vertical velocity of wheel 15 at this resonant frequency. Referring to FIG. 3, there is shown a graphical representation of the ratio of the vertical wheel velocity, $v_W$, to $v_R$, the vertical velocity of the tire portion contacting the road, as a function of frequency showing the peak at $\omega_1 = 1/\sqrt{C_T M_W}$.

A disadvantage of this resonance is that in order to reduce the wheel excursion at this resonance $\omega_1$, shock 14 must transmit considerable forces to sprung mass 11. Furthermore, in an electrically controlled system, this resonance significantly increases the peak energy requirements imposed upon such a system attempting to resist transmission through a controlled suspension member. In a conventional system, this resonance constrains the mechanical impedance presented by spring 13 and shock 14 to be suffiently high to resist transmission of this resonant force component and thereby provide a stiffer ride than would ordinarily be desired.

Figure 4:
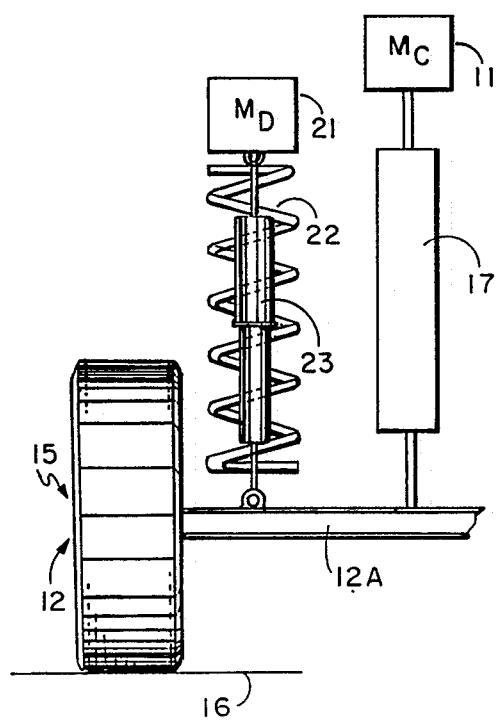
FIG. 4 is a combined block-diagrammatic representation of a vehicle wheel assembly damped according to the invention.

Referring to FIG. 4, there is shown a combined block-diagrammatic representation of a system according to the invention incorporating a damping assembly that appreciably reduces the resonance effects described above. Sprung mass portion 11 is connected to wheel assembly 12 by suspension member 17, which may be an electrically controlled suspension. A damping assembly comprising damping mass 21 is connected to wheel assembly 12 by damping spring 22 in parallel with damping resistance 23, which may be a conventional shock absorber. The system is free of a damping element in parallel with an active component of the system.

Figure 5:
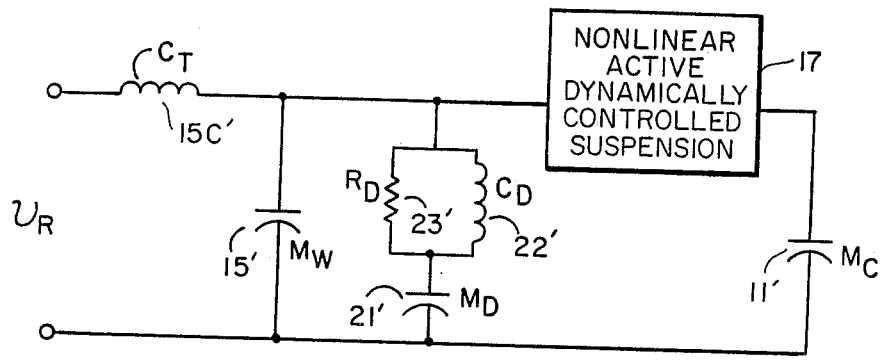
FIG. 5 is a schematic circuit diagram of the mechanical system of FIG. 4.
Figure 6:
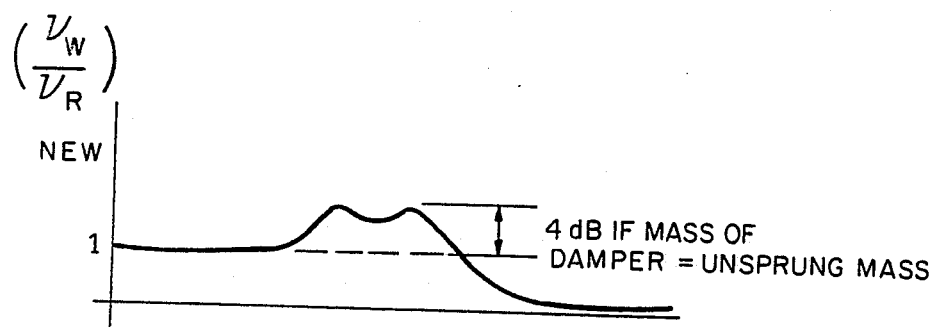
FIG. 6 is a graphical representation of the response of the mechanical system of FIGS. 4 and 5.

Referring to FIG. 5, there is shown a schematic circuit diagram of the mechanical system of FIG. 4. The only changes over the circuit of FIG. 2 are the mechanical circuit comprising the series combination of damping spring compliance 22' shunted by damping resistance 23' and damping mass 21' in shunt with unsprung mass 15' and suspension member 17. The result of this arrangement is that the peak shown in FIG. 3 is now significantly damped. If the mass of damping mass 21' is made substantially equal to the unsprung mass $M_W$, the resulting response is staggered tuned peaks only four db above unity as shown in FIG. 6. FIG. 6 shows a graphical representation of the ratio of vertical wheel velocity $v_W$ to $v_R$, the vertical velocity of the tire portion contacting the road, as a function of frequency. A typical frequency for the unsprung mass tire compliance resonance is 15 Hz largely established by the tire compliance and unsprung mass. Damping mass 21' absorbs most of the wheel resonant energy. A preferred range for the ratio of damping mass 21' to unsprung mass is 0.5 to 1.5 with a ratio of substantially unity preferred.

Figure 7:
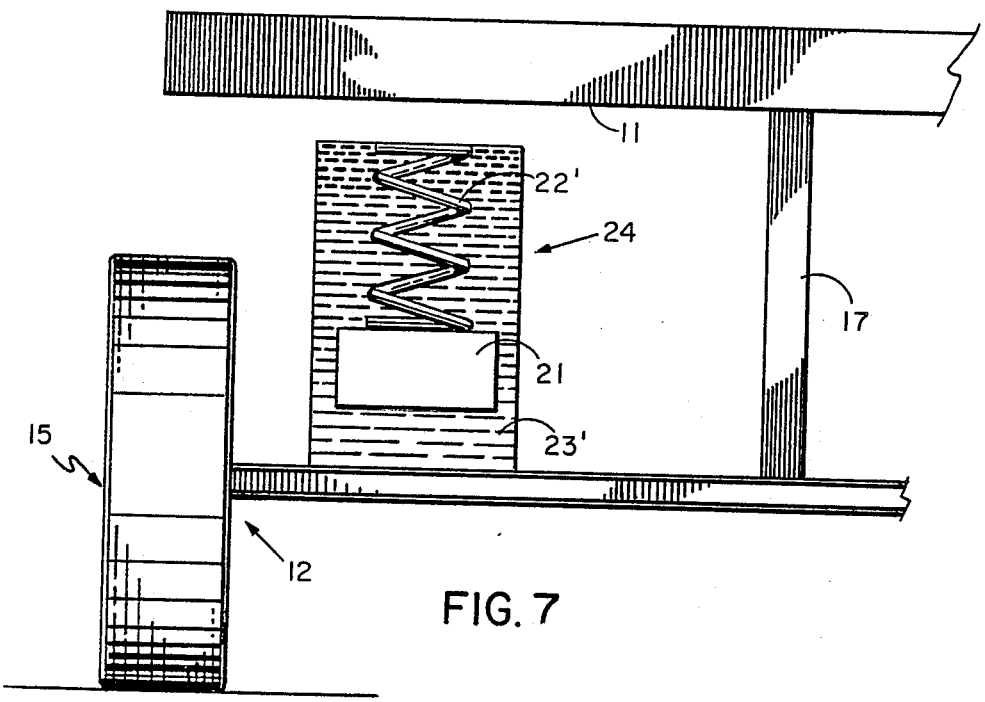
FIG. 7 is a diagrammatic representation of another embodiment of the invention.

Referring to FIG. 7, there is shown a combined block-diagrammatic representation of another embodiment of the invention in which a sealed cylinder 24 is fastened to the wheel assembly member 12, and the damping mass 21 is suspended from the damping spring 22' inside damping fluid 23' in sealed cylinder 24.

The invention has been described with respect to a single wheel to avoid obscuring the principles of the invention. The principles are applicable to other wheels on a vehicle. The invention is preferably used in connection with an electrically dynamically controlled nonlinear active system for vehicle suspension.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a vehicle having a sprung mass and an unsprung mass including a wheel and a wheel support member, suspension apparatus comprising,
    a nonlinear active dynamically controlled suspension system intercoupling said sprung mass and said unsprung mass,
    a wheel damper,
    and a wheel damper supporting structure connecting said wheel damper to said wheel support member constructed and arranged to prevent transfer of force between said unsprung mass and said sprung mass through said wheel damper.

2. Suspension apparatus in accordance with claim 1 constructed and arranged so that there is insubstantial net resistive force between said sprung mass and said unsprung mass.

3. Suspension apparatus in accordance with claim 2 wherein the ratio of the mass of said wheel damper to said unsprung mass is in the range of 0.5 to 1.5.

4. Suspension apparatus in accordance with claim 3 wherein said wheel damper includes a damping mass and a damping spring connecting said damping mass to said wheel support member,
    a mechanical resistance in parallel with said damping spring,
    said damping mass being relatively movable with respect to said wheel support member.

5. Suspension apparatus in accordance with claim 3 wherein said ratio is substantially 1.0.

6. Suspension apparatus in accordance with claim 5 wherein said wheel damper includes a damping mass and a damping spring connecting said damping mass to said wheel support member,
    a mechanical resistance in parallel with said damping spring,
    said damping mass being relatively movable with respect to said wheel support member.

7. Suspension apparatus in accordance with claim 2 wherein said wheel damper includes a damping mass and a damping spring connecting said damping mass to said wheel support member,
    a mechanical resistance in parallel with said damping spring,
    said damping mass being relatively movable with respect to said wheel support member.

8. Suspension apparatus in accordance with claim 1 wherein the ratio of the mass of said wheel damper to said unsprung mass is in the range of 0.5 to 1.5.

9. Suspension apparatus in accordance with claim 8 wherein said ratio is substantially 1.0.

10. Suspension apparatus in accordance with claim 9 wherein said wheel damper includes a damping mass and a damping spring connecting said damping mass to said wheel support member,
    a mechanical resistance in parallel with said damping spring,
    said damping mass being relatively movable with respect to said wheel support member.

11. Suspension apparatus in accordance with claim 3 wherein said wheel damper includes a damping mass and a damping spring connecting said damping mass to said wheel support member,
    a mechanical resistance in parallel with said damping spring,
    said damping mass being relatively movable with respect to said wheel support member.

12. Suspension apparatus in accordance with claim 1 wherein said wheel damper includes a damping mass and a damping spring connecting said damping mass to said wheel support member,
    a mechanical resistance in parallel with said damping spring,
    said damping mass being relatively movable with respect to said wheel support member.

13. Suspension apparatus in accordance with claim 12 wherein said wheel damper comprises a sealed cylinder attached to said wheel support member,
    said mechanical resistance comprises damping fluid inside said sealed cylinder, and said damping spring comprises a spring inside said sealed cylinder.

14. Suspension apparatus in accordance with claim 13 wherein said spring is suspended from an end of said sealed cylinder.

15. Suspension apparatus in accordance with claim 13 wherein said damping mass is a mass suspended from said spring inside said sealed cylinder.

16. Suspension apparatus in accordance with claim 1 wherein said suspension apparatus is free of a damping element in parallel with said nonlinear active dynamically controlled suspension system.

17. In a vehicle having a sprung mass and an unsprung mass including a wheel and a wheel support member, suspension apparatus comprising,
   a nonlinear active dynamically controlled suspension system intercoupling said sprung mass and said unsprung mass,
   and a wheel damper connected to said wheel support member,
   wherein said wheel damper includes a damping mass and a damping spring connecting said damping mass to said wheel support member,
   a mechanical resistance in parallel with said damping spring,
   said damping mass being relatively movable with respect to said wheel support member.

18. Suspension apparatus in accordance with claim 17 constructed and arranged so that there is insubstantial net resistive force between said sprung mass and said unsprung mass.

19. Suspension apparatus in accordance with claim 18 wherein the ratio of the mass of said wheel damper to said unsprung mass is in the range of 0.5 to 1.5.

20. Suspension apparatus in accordance with claim 19 wherein said ratio is substantially 1.0.

21. Suspension apparatus in accordance with claim 17 wherein the ratio of the mass of said wheel damper to said unsprung mass is in the range of 0.5 to 1.5.

22. Suspension apparatus in accordance with claim 21 wherein said ratio is substantially 1.0.

23. Suspension apparatus in accordance with claim 17 wherein said wheel damper comprises a sealed cylinder attached to said wheel support member,
   said mechanical resistance comprises damping fluid inside said sealed cylinder,
   and said damping spring comprises a spring inside said sealed cylinder.

24. Suspension apparatus in accordance with claim 23 wherein said spring is suspended from an end of said sealed cylinder.

25. Suspension apparatus in accordance with claim 23 wherein said damping mass is a mass suspended from said spring inside said sealed cylinder.

26. In a vehicle having a sprung mass and an unsprung mass including a wheel and a wheel support member, suspension apparatus comprising,
   a nonlinear active dynamically controlled suspension system intercoupling said sprung mass and said unsprung mass,
   and a wheel damper connected to said wheel support member, wherein said suspension apparatus is free of a damping element in parallel with said nonlinear active dynamically controlled suspension system.

27. In a vehicle having a sprung mass and an unsprung mass including a wheel and a wheel support member, suspension apparatus comprising,
   a nonlinear active controlled suspension system intercoupling said sprung mass and said unsprung mass,
   a wheel damper,
   and a wheel damper supporting structure connecting said wheel damper to said wheel support member constructed and arranged to prevent transfer of force between said unsprung mass and said sprung mass through said wheel damper.

28. Suspension apparatus in accordance with claim 27 constructed and arranged so that there is insubstantial net resistive force between said sprung mass and said unsprung mass.

29. Suspension apparatus in accordance with claim 28 wherein the ratio of the mass of said wheel damper to said unsprung mass is in the range of 0.5 to 1.5.

30. Suspension apparatus in accordance with claim 29 wherein said ratio is substantially 1.0.

31. Suspension apparatus in accordance with claim 27 wherein the ratio of the mass of said wheel damper to said unsprung mass is in the range of 0.5 to 1.5.

32. Suspension apparatus in accordance with claim 31 wherein said ratio is substantially 1.0.

33. In a vehicle having a sprung mass and an unsprung mass including a wheel and a wheel support member, suspension apparatus comprising,
   a nonlinear active dynamically controlled suspension system intercoupling said sprung mass and said unsprung mass,
   and a wheel damper connected to said wheel support member, wherein said wheel damper includes at least a damping mass.

34. Suspension apparatus in accordance with claim 33 wherein said wheel damper also includes at least a damping spring.

35. Suspension apparatus in accordance with claim 34 wherein said wheel damper further includes at least a damping resistance.

* * * * *